Patented Oct. 31, 1950

2,527,821

UNITED STATES PATENT OFFICE 2,527,821

POLYMER CONTAINING EXTRALINEAR HYDANTOIN RINGS FROM MONO-OLEFIN/CARBON MONOXIDE POLYMER

John R. Johnson, Ithaca, N. Y., assignor to E. I. du Pont de Nemours & Company, Wilmington, Del., a corporation of Delaware No Drawing. Application September 24, 1948, Serial No. 51,117

7 Claims. (Cl. 260—63)

This invention relates to new compositions of matter and more particularly to new polymeric materials and to their preparation.

This invention has as an object a new and useful composition of matter. A further object is a new and useful type of polymer comprising a polyhydantoin. Still further objects reside in methods for preparing these polyhydantoins.

Monomeric hydantoins have long been known in the art and their preparation from aldehydes and ketones has been carefully investigated. However, polyhydantoins, i. e., polymers containing a plurality of hydantoin rings external to the polymer chain have not been described heretofore.

The polymers of this invention have a chain of contiguous carbon atoms and contain a plurality of extralinear hydantoin rings,

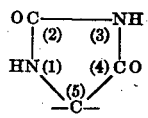

the 5-carbon in the ring, that is the carbon atom joined to the imino and carbonyl groups of the hydantoin ring, being a carbon atom of the polymer chain.

These polyhydantoins are obtained by reacting in the presence of ammonia and carbon dioxide a water-soluble cyanide with a monoolefin/carbon monoxide polymer, this polymer being a polyketone containing the carbonyl carbon in the chain of contiguous atoms comprising the polymer chain.

In the preparation of the present polyhydantoins, ammonia gas and carbon dioxide gas can be pressured into the reactor containing the monoolefin/carbon monoxide polymer and water-soluble cyanide such as ammonium cyanide or the alkali or alkaline earth metal cyanides, e. g., sodium, potassium, magnesium, calcium or lithium cyanide, together with organic solvent if a reaction solvent is used. It is more convenient, however, to use reagents which readily evolve ammonia and carbon dioxide, such as ammonium carbonate or ammonium carbamate rather than to introduce the ammonia and carbon dioxide as such into the reaction mixture. A reagent of this kind may be defined as that derived from the system

capable of regenerating all of these components under the conditions of the reaction. Ammonium cyanide when used can, if desired, be prepared in situ by charging hydrogen cyanide and ammonia, or by employing equivalent amounts of ammonium chloride and sodium cyanide. Although water soluble cyanides in general can be used, ammonium cyanide is preferred because of absence of complicating side reactions and because of the improved quality of the product obtained. Although water is needed eventually in the synthesis, sufficient water is formed in the intermediate steps. Thus, in theory, it is unnecessary to add any water, even to an anhydrous system of the polyketone, hydrogen cyanide, carbon dioxide and ammonia. However, to facilitate the reaction, it is regarded as desirable in all cases to add extra water.

A suitable method for preparing the polyhydantoins described herein consists in charging the monoolefin/carbon monoxide polymer into a pressure reactor together with sodium cyanide, ammonium carbonate, water and dioxane as a reaction solvent. The reactor is closed, evacuated, agitated and heated to a temperature at which a reaction occurs at a suitable rate. After reaction is complete, the reactor is cooled and the product isolated. The process can be carried out as a batch or as a semi-continuous or continuous process. In the examples which follow the quantities are given in parts by weight unless otherwise designated. The inherent viscosities mentioned, are obtained by the following method of calculation, wherein the measurements are made at 85° C. on solutions of 0.0625 gram of polymer in 50 mls. of xylene; inherent viscosity equals the natural logarithm of the relative viscosity divided by the concentration in grams per 100 cc. of solution, where the relative viscosity is the ratio of the viscosity of the solution to that of the pure solvent.

The following examples in which the parts are by weight are further illustrated by the practice of this invention.

*Example I*

A glass reactor fitted with suitable means for agitation of the contents, a reflux condenser, and entry and exit ports, is charged with 386 parts of dioxane and 70 parts of an ethylene/carbon monoxide copolymer containing ethylene and carbon monoxide in a molar ratio of 4.08:1 and having a molecular weight of 1152 and an inherent viscosity of 0.111. This mixture is heated to 60° C. and stirred. A solution comprising 96 parts of lump ammonium carbonate dissolved in 250 parts of water is then added. This is followed by adding a solution of 25 parts of sodium cyanide in 100 parts of water over a period of 45 minutes. Stirring and heating at 60° C. are continued for an additional three hours. The reaction mixture is then poured into water and the upper oil layer which separates is taken up in benzene. The excess water is separated from this layer and the benzene removed by distillation. The non-volatile residue remaining is maintained at 100° C. under reduced pressure for one hour in order to remove traces of moisture and the solvent. There is thus obtained 70 parts of a polyhydantoin as a dark, straw-colored resin. This product analyzes for 76.93% carbon, 11.42% hydrogen and 3.50% nitrogen (Dumas procedure). From these data it is calculated that 27% of the carbonyl groups of the parent ethylene/carbon monoxide polymer are converted to hydantoin groups.

*Example II*

A glass reactor fitted with suitable means for agitating the contents, a reflux condenser, and entry and exit ports, is charged with 393 parts of isopropyl alcohol and 10.7 parts of an ethylene/propylene/carbon monoxide polymer containing 30.6% combined carbon monoxide. The temperature is adjusted to 45° C. and a solution of ammonium cyanide obtained by dissolving 6 parts of sodium cyanide and 7 parts of ammonium chloride in 75 parts of water is added. The temperature is adjusted to 55-60° C. and 46 parts of ammonium carbonate added to the reaction mixture. Stirring is continued at this temperature for 12 hours. Excess ammonium carbonate and most of the isopropyl alcohol are then removed by distillation. The concentrated isopropyl alcohol solution remaining is poured into ice-water with rapid agitation. The light tan, granular precipitate which separates is filtered and dried in a vacuum oven. There is thus obobtained 10.8 parts of a light tan, dried powder, which analyzes as follows: 67.07% C, 8.89% H, 11.82% N and molecular weight 1620. From these data it is calculated that all of the carbonyl groups of the parent ethylene/propylene/carbon monoxide polymer are converted to hydantoin rings.

*Example III*

A stainless steel reaction vessel is charged with 157 parts of lump ammonium carbonate, 29.5 parts of sodium cyanide, 100 parts of dioxane, 100 parts of water and 39 parts of an ethylene/carbon monoxide polymer having an inherent viscosity of 0.139, a molecular weight of 2,032 and an ethylene/carbon monoxide molar ratio of 1.76:1. The vessel is then closed, evacuated and placed in a shaker machine. Agitation is started and the temperature raised to 100° C. and maintained at this level for 15 hours. At the end of this time the reactor is allowed to cool, opened to the atmosphere and the contents discharged onto 1,500 parts of cracked ice. A light-cream-colored, granular precipitate separates which is removed by filtration and washed with water. The washed product is dried in a vacuum oven at 50° C. for 16 hours. There is thus obtained 44 parts of a polyhydantoin as a nearly white, very fine powder. This product has an inherent viscosity of 0.12 and analyzes for 63.61% carbon, 7.71% hydrogen and, as determined by the Dumas procedure, 15.53% nitrogen. From these data it is calculated that 82% of the carbonyl groups of the parent polymer are converted to hydantoin groups.

Thirty parts of the above polyhydantoin is ball-milled with 15 parts of wood flour and 4.5 parts of paraformaldehyde for 18 hours. The molding powder thus obtained is molded into bars by pressing at 2,000 lb./sq. in. pressure for five minutes at 150° C. An infusible molding with the following properties is obtained:

| Property | ASTM Test | Value |
|---|---|---|
| Tensile Strength | D-638-44T using a rectangular bar. | 4179 lb./sq. in. |
| Flexural Strength | D-790-44T | 7309 lb./sq. in. |
| Impact Strength | D-256-43T | 0.16 ft. lb./in. of notch. |
| Rockwell Hardness | D-785-44T | M-77 |
| Heat Distortion Temperature. | D-648-45T | 102° C. |
| Stiffness in Flexure | D-747-43T | 577,953 lb./sq. in. |

Water Absorption in 24 hours at 100% humidity, 3.61% by weight.

*Example IV*

A glass reactor fitted with suitable means for agitating the contents, a reflux condenser, and entry and exit ports, is charged with 500 parts of isopropyl alcohol and 78 parts of an ethylene/carbon monoxide copolymer having a molecular weight of 1411 and containing ethylene and carbon monoxide in a molar ratio of 1.79:1. The temperature is adjusted to 60° C. and 393 parts of lump ammonium carbonate is added. To the resulting suspension is added with stirring a solution of 49 parts of sodium cyanide in 100 parts of water. Stirring is continued for 4 hours maintaining the temperature at 60-70° C. The reaction mixture is then poured into a large excess of water with rapid stirring, and the fine white precipitate which separates is removed by filtration. There is thus obtained 80 parts of a polyhydantoin as a nearly white, very fine powder. This product analyzes for 66.05% carbon, 8.30% hydrogen and, as determined by the Kjeldahl procedure, 15.63% nitrogen. From these data it is calculated that 83% of the carbonyl groups of the parent ethylene/carbon monoxide polymer are converted to hydantoin groups.

Fifteen (15) parts of the above polyhydantoin is dissolved in 200 parts of ethanol by heating at 80° C. for one hour. The temperature of the light straw colored solution thus obtained is adjusted to 60° C. and 85 parts of a 37% aqueous formaldehyde solution and 0.12 parts of a 10% aqueous sodium hydroxide solution are added. The resulting mixture is stirred at 60° C. for one hour and then poured into an excess of water with rapid agitation. The precipitate, which separates, is removed by filtration, washed with water and dried. There is thus obtained 12 parts of the N-methylol derivative of the polyhydantoin as a pale yellow, finely divided solid.

The above N-methylol derivative of the polyhydantoin is pressed at 150° C. under 5,000 lb./sq. in. for five minutes. A hard, light brown, infusible molding is obtained. A thin film molded under similar conditions is clear, transparent, flexible and tough.

*Example V*

A glass reactor fitted with a stirrer, thermometer, and reflux condenser is charged with 789 parts of isopropyl alcohol and 78 parts of an ethylene/carbon monoxide polymer having an inherent viscosity of 0.072, a molecular weight of 1411, and an ethylene/carbon monoxide mole ratio of 1.79:1. The temperature is brought to 45° C. and 60 parts of ammonium chloride dissolved in 180 parts of water is added, followed by adding 52 parts of sodium cyanide in 150 parts of water over a period of 30 minutes, i. e., effectively adding a solution of ammonium cyanide. After stirring for one hour at 42–48° C., 250 parts of pulverized lump ammonium carbonate is added. The mixture is then stirred for 4 hours, while maintaining the temperature at 55–60° C. Excess ammonium carbonate and isopropyl alcohol are removed by distillation leaving a concentrated solution of polyhydantoin in isopropyl alcohol. This solution is then poured into excess ice-water with rapid agitation, and the white precipitate which separates is filtered and dried. There is thus obtained 73 parts of a white, finely-divided polyhydantoin which is readily soluble in 5% aqueous sodium hydroxide solution. The polyhydantoin analyzes for 64.95% C, 8.04% H, and 15.09% N. From these data it is calculated that 80% of the carbonyl groups of the parent ethylene/carbon monoxide polymer are converted to hydantoin groups.

*Example VI*

A glass reactor fitted with suitable means for agitating the contents, a reflux condenser, and entry and exit ports, is charged with 393 parts of isopropyl alcohol, and 25 parts of an ethylene/isobutylene/carbon monoxide polymer having a molecular weight of 929 and containing 30.2% combined carbon monoxide. The temperature is adjusted to 45° C. and a solution of ammonium cyanide obtained by mixing a solution of 12.9 parts of sodium cyanide dissolved in 45 parts of water and 15 parts of ammonium chloride dissolved in 37.5 parts of water is added. This is followed by adding 86 parts of ammonium carbonate and adjusting the temperature of the reaction mixture to 60° C. The reactants are stirred at 55–60° C. for 5.5 hours. The excess ammonium carbonate and most of the isopropyl alcohol solvent are then removed by distillation. The concentrated isopropyl alcohol solution remaining is poured into ice-water with rapid agitation. The precipitate thus obtained is filtered and dried in a vacuum oven. There is obtained 26 parts of a transparent, brittle, straw-colored resin which analyzes for 67.31% C, 9.38% H, 9.82% N, and molecular weight 1225. From these data it is calculated that 83% of the carbonyl groups of the parent ethylene/isobutylene/carbon monoxide polymer are converted to hydantoin rings.

*Example VII*

A glass reactor fitted with a stirrer, thermometer, and reflux condenser is charged with 789 parts of isopropyl alcohol and 132 parts of an ethylene/carbon monoxide polymer having a molecular weight of 927 and an ethylene/carbon monoxide mole ratio of 8.42:1. The temperature is brought to 50° C. and 30 parts of ammonium chloride dissolved in 90 parts of water and 26 parts of sodium cyanide dissolved in 75 parts of water is added to the stirred mixture, i. e., effectively a solution of ammonium cyanide is added. Stirring is continued for two hours holding the temperature at 40–50° C. and 157 parts of pulverized ammonium carbonate then added. Stirring is continued for an additional four hours maintaining the temperature at 55–60° C. Excess ammonium carbonate and isopropyl alcohol are removed by distillation leaving a concentrated solution of polyhydantoin in isopropyl alcohol. This solution is then poured into excess ice-water with rapid agitation, and the white, wax-like precipitate that separates is filtered and dried. There is thus obtained 122 parts of a white, wax-like polyhydantoin which analyzes for 77.82% C, 12.19% H, 3.71% N. From these data it is calculated that 44% of the carbonyl groups of the parent polymer are converted to hydantoin groups.

In the foregoing examples the ammonium carbonate is the article of commerce which is designated by this name, but which in reality is considered to be a mixture of ammonium bicarbonate and ammonium carbamate as reported on page 801 of "Inorganic Chemistry" by F. Ephraim (third edition, translated by P. C. L. Thorne and A. M. Ward, Nordeman Publishing Company, New York, 1939). Other reagents likewise can be used which are derived from the system $NH_3$—$CO_2$—$H_2O$ and which are capable of generating all these components under the conditions of the reaction. When ammonium carbonate, as above defined, is used it is not necessary that further water be present, although to facilitate the synthesis it is desirable that some water be added to the reaction mixture.

In general, the process is operable at temperatures ranging from room temperature (about 25° C.) to 300° C. The pressure is not critical; the reaction can be carried out at pressures of from subatmospheric to a maximum determined by the mechanical limitations of the equipment employed and the nature of the reactants involved. In general it is preferred to operate at a temperature of 50–75° C. and under a total pressure no greater than that of the autogenous pressure obtained when a closed system is used under such reaction conditions employing a reaction cycle of one to five hours. The reaction is carried out under basic conditions at a pH above 7.

The optimum reaction conditions with regard to temperature, concentration and duration of reactions, etc., will vary somewhat depending upon the particular monoolefin/carbon monoxide polymer used, the degree of conversion of carbonyl groups to hydantoin groups desired, and the basicity of the reaction mixture. At least one mole each of the cyanide, ammonia, and carbon dioxide is reacted for each carbonyl group in the polyketone desired to be converted to a hydantoin group. From one to all of the carbonyl groups (the number of which depends upon the molecular weight of the polyketone, the particular monoolefin, and upon the molecular ratio thereof to the carbon monoxide used in the preparation of the polyketone) can be thus converted.

The proportions of reactants necessary to prepare the novel products of this invention will vary considerably with the particular polyketone being used. For instance, 10,000 parts of a polyketone of molecular weight 10,000 containing a four carbon olefin and carbon monoxide in the mole ratio 150:1 require a minimum of 20.2 parts of ammonia, 52.2 parts of carbon dioxide and 32 parts of hydrogen cyanide for conversion of all the carbonyl groups to hydantoin rings. On the other hand the same quantity of polyketone of molecular weight 250 containing a two carbon olefin and carbon monoxide in the mole ratio 1:1 requires a minimum of 3037.8 parts of ammonia, 7850.5 parts of carbon dioxide and 4821.6 parts of hydrogen cyanide for conversion of all the carbonyl groups to hydantoin rings.

In order that the polyhydantoins described herein may differ sufficiently from the initial polyketones to possess the desired properties, at least 5% of the carbonyl groups of the polyketone should be converted to hydantoin rings. For instance, 10,000 parts of a polyketone of molecular weight 10,000 containing a four carbon olefin and carbon monoxide in the mole ratio 150:1 require a minimum of 1.01 parts of ammonia, 2.61 parts of carbon dioxide and 1.6 parts of hydrogen cyanide for conversion of 5% of the carbonyl groups to hydantoin rings. The same quantity of a polyketone of molecular weight 250 containing a two carbon olefin and carbon monoxide in the mole ratio 1:1 requires a minimum of 151.89 parts of ammonia, 392.52 parts of carbon dioxide and 241.08 parts of hydrogen cyanide for conversion of 5% of the carbonyl groups to hydantoin rings For conversion of from 5 to 100% of the carbonyl groups, excesses of carbon dioxide and ammonia may be used to facilitate completeness of reaction. However, only in those cases where 100% conversion of all the carbonyl groups is desired can there be used an excess of hydrogen cyanide over the amount theoretically called for to give the desired per cent conversion of carbonyl groups to hydantoin rings.

Depending on the melting point and solubility (which are determined by the molecular weight and/or by the monoolefin/carbon monoxide mole ratio in the polymer) of the monoolefin/carbon monoxide polymer being used, as well as the reaction temperature involved, a reaction solvent may or may not be used. In those cases where a reaction solvent is used, the suitable solvents will include such liquids as dioxane or water-miscible alcohols easily removable at low temperatures, for example, methanol, ethanol, propanol, isopropanol and butanol. Of these dioxane and isopropanol are preferred since these are excellent solvents for the polymeric polyhydantoins formed and at the same time are good solvents for the majority of the monoolefin/carbon monoxide polymers reacted.

The monoolefin/carbon monoxide polymers, which are the polyketones used in the practice of this invention, are obtained by polymerizing with carbon monoxide a monoolefin containing from 2 to 4 carbon atoms in contact with a peroxy catalyst or other polymerization catalyst. These polymers which have a chain consisting of singly bonded carbon atoms, are disclosed and claimed in application Serial Number 552,374 filed September 1, 1944 by M. M. Brubaker and now abandoned. As there disclosed, these polymers are obtained by reacting the monoolefin with carbon monoxide in contact with a peroxy catalyst and in the absence of a Friedel-Crafts catalyst at temperatures of from 25° C. to 350° C. under any pressure above atmospheric. Particularly favorable reaction conditions include temperatures of about 50° C. to 150° C. and pressures of 20 to 1500 atmospheres. The monoolefin/carbon monoxide polymer used in Example VII was made by the following procedure:

A steel pressure vessel is charged with 530 parts of cyclohexane and 15.9 parts of di(tertiary butyl)peroxide. The vessel is closed, evacuated, placed in a shaker machine and connected to a reservoir containing a gas mixture of 65% ethylene and 35% carbon monoxide under high pressure. Agitation is started and the temperature is brought to 135° C. Concurrently the pressure is adjusted to 3,000 lb./sq. in. by bleeding the ethylene/carbon monoxide mixed gas from the reservoir. The reactants are then maintained at a temperature of 132–136° C. and under a pressure of 2,200–3,000 lbs./sq. in. for 14 hours by intermittent addition of the mixed gas. The reactor is allowed to cool, opened, and the contents discharged. The product comprising polyketone and cyclohexane is subjected to distillation to remove the cyclohexane. There is thus obtained 1536 parts of an ethylene/carbon monoxide polyketone as a light brown, hard wax. This polyketone has a molecular weight of 1411 and analyzes for 70.23% carbon, 9.26% hydrogen, 20.51% oxygen which corresponds to a product containing 35.89% combined carbon monoxide, and 64.11% combined ethylene. These data indicate an ethylene/carbon monoxide mole ratio of 1.79:1.

The monoolefin/carbon monoxide polymers mentioned in the examples can be replaced by any of the polyketones obtained by reacting carbon monoxide with an olefin of 2 to 4 carbon atoms, e. g. ethylene, propylene, butene-1 or butene-2, or with a mixture of these olefins. The main chain of the resultant polymer will contain only singly bonded carbon atoms, and the units attached to the chain carbons other than the ketone carbon will be hydrogen atoms, methyl, and/or ethyl groups depending upon the monoolefin used. These polymers, which should consist of more than 50% by weight of the polymerization product of carbon monoxide and the monoolefin, can if desired, be modified by including with the reaction mixture of carbon monoxide and monoolefin a minor amount of other known polymerizable monomers, for example vinylidene compounds such as vinyl chloride, vinyl acetate, styrene; methyl methacrylate, methyl acrylate, vinylidene chloride; vinylene compounds, e. g., dimethyl maleate, maleic anhydride, etc.

The properties of these monoolefin/carbon monoxide polymers can be varied by adjusting either the molecular weight or the mole ratio of the monoolefin or monoolefins to carbon monoxide or both. The monoolefin/carbon monoxide polymers that can be used in preparing the polyhydantoins of this invention have a monoolefin/carbon monoxide ratio of from 1:1 to 150:1. The molecular weight should be at least 250, but the polyketones can otherwise be of any higher degree of polymerization, e. g., of a molecular weight of 10,000 or greater, that can be obtained in the case of these polymers. For the present purpose it is most advantageous to use those polymers having a molecular weight of from 500 to 5,000 and a monoolefin/carbon monoxide mole ratio of from 1.5:1 to 10:1.

The variations mentioned above in molecular weight and in the mole ratio of monoolefin to carbon monoxide that can be obtained readily in the monoolefin/carbon monoxide polymers makes possible, by means of the reaction described herein, the preparation of an entire family of novel polyhydantoins. Further, since it is possible through variations in concentration and in other reaction conditions to react from one to essentially all the carbonyl groups in the monoolefin/carbon monoxide polymer being used, this family of polyhydantoins can vary markedly in molecular weight and in chemical constitution through variations in the ratio of hydantoin groups to unreacted carbonyl groups and through variations in the molar ratios of monoolefin and carbon monoxide in the initial polymer. The introduction of the hydantoin ring also provides a means for the controlled crosslinking of these polyhydantoins through reaction with formaldehyde donors or other aldehydes under selected conditions of temperature and pressure, or through preparation of the methylol derivatives of the hydantoin rings in the polyhydantoins. In the production of methylol derivatives through reaction with formaldehyde or a source thereof, such as paraformaldehyde, the methylol group apparently enters the hydantoin ring in position 1, i. e.,

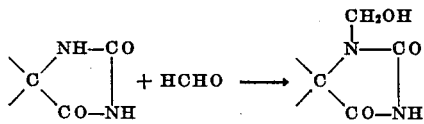

The polyhydantoins of this invention may be hydrolyzed to poly-alpha-amino acids which are useful per se or as intermediates for other syntheses.

The polyhydantoins described herein can themselves be molded to produce moldings of good physical properties. They can also be used as textile finishes and nylon sizes. The easily controlled variations referred to above in molecular weight and in chemical constitution yields an entire range of polymers widely varying in such properties as melting point, solubility, stiffness, hardness, flexibility, plasticity, brittleness, textile strength, flexural strength, elongation, cold crack, etc. The polymers of this invention can be used in such widely divergent applications as molding resins due to their good strength and toughness, as paper chemicals due to their good wet-strength properties, as textile chemicals for shrink-proofing agents, and as finishes in combination with alkyd resins. In general they are useful in all the fields of application of the well-known urea/formaldehyde and melamine/formaldehyde resins. The present polymers, however, have a wider utility than the resins just mentioned since the polyhydantoins, and accordingly the corresponding polyhydantoin/formaldehyde resins, can be varied to any desired degree in such properties as molecular weight, solubility, softening point, etc.

As many apparently widely different embodiments of this invention may be made without departing from the spirit and scope thereof, it is to be understood that I do not limit myself to the specific embodiments thereof except as defined in the appended claims.

I claim:

1. Polymeric material consisting of a monoolefin/carbon monoxide polymer of molecular weight of at least 250 in which the monoolefin contains from 2 to 4 carbon atoms and in which the mole ratio of monoolefin to carbon monoxide is from 1:1 to 150:1, at least 5% of the carbonyl groups of said polymer being replaced by hydantoin rings, the carbon atom of each hydantoin ring which is joined to the imino and carbonyl groups of said ring, being a carbon atom of the polymer chain.

2. The polymeric material defined in claim 1 in which said monoolefin/carbon monoxide polymer has a molecular weight of from 500 to 5000.

3. The polymeric material defined in claim 1 in which the mole ratio of monoolefin to carbon monoxide is from 1.5:1 to 10:1.

4. A process for obtaining polymeric materials containing a plurality of hydantoin rings, said process comprising contacting at a temperature of from 25° C. to 300° C. a polyketone having a molecular weight of at least 250 with a water-soluble cyanide in the presence of ammonia, carbon dioxide and water, said cyanide, ammonia, carbon dioxide, and water being present in amount which converts at least 5% of the carbonyl groups in said polyketone to hydantoin groups, and in amount of at least 1 mole each of said cyanide, ammonia, carbon dioxide, and water for each carbonyl group converted to a hydantoin ring, said polyketone being a polymer which comprises the reaction product of carbon monoxide and a monoolefin having from two to four carbons, and in which the mole ratio of combined monoolefin to carbon monoxide is from 1:1 to 150:1.

5. The process set forth in claim 4 in which said polyketone has a molecular weight of from 500 to 5000 and in which the mole ratio of combined monoolefin to carbon monoxide is from 1.5:1 to 10:1.

6. The process set forth in claim 4 in which said polyketone comprises the reaction product of carbon monoxide and ethylene.

7. The process set forth in claim 4 in which said temperature is from 50° C. to 75° C.

JOHN R. JOHNSON.

REFERENCES CITED

The following references are of record in the file of this patent:

Bucherer et al., Journ. fur praktische chemie, vol. 141, 1934, pp. 5 and 29.